(12) United States Patent
Hoshino et al.

(10) Patent No.: US 7,360,793 B2
(45) Date of Patent: Apr. 22, 2008

(54) STRUCTURE FOR FIXING STEERING COLUMN WITH FASTENER AND DISK SPRING

(75) Inventors: Shigeru Hoshino, Toyota (JP); Kenji Imamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 292 days.

(21) Appl. No.: 11/192,001

(22) Filed: Jul. 29, 2005

(65) Prior Publication Data

US 2006/0043722 A1    Mar. 2, 2006

(30) Foreign Application Priority Data

Aug. 25, 2004  (JP) .............................. 2004-244666

(51) Int. Cl.
 *B62D 1/11* (2006.01)
(52) U.S. Cl. ..................... 280/777; 280/780
(58) Field of Classification Search ............. 280/777, 280/775, 776, 779, 780; 74/492, 493; *B62D 1/19*
See application file for complete search history.

(56) References Cited

U.S. PATENT DOCUMENTS

| | | | | |
|---|---|---|---|---|
| 3,373,965 | A * | 3/1968 | Bien et al. ............... | 248/205.1 |
| 4,786,076 | A * | 11/1988 | Wierschem ................. | 280/777 |
| 4,943,028 | A * | 7/1990 | Hoffmann et al. .......... | 248/548 |
| 5,085,549 | A * | 2/1992 | Londry ....................... | 411/339 |
| 6,092,957 | A * | 7/2000 | Fevre et al. ................ | 403/373 |
| 6,530,600 | B1 * | 3/2003 | Marxer et al. .............. | 280/777 |
| 6,981,430 | B2 * | 1/2006 | Murakami et al. .......... | 74/493 |
| 2003/0209102 | A1* | 11/2003 | Murakami et al. .......... | 74/493 |
| 2005/0066761 | A1* | 3/2005 | Arihara ....................... | 74/493 |
| 2005/0178231 | A1* | 8/2005 | Schick et al. ................ | 74/493 |
| 2005/0269812 | A1* | 12/2005 | Yamada ....................... | 280/777 |
| 2006/0022446 | A1* | 2/2006 | Murakami et al. .......... | 280/775 |
| 2006/0049620 | A1* | 3/2006 | Lee ............................. | 280/777 |

(Continued)

FOREIGN PATENT DOCUMENTS

JP   A 2000-335430    12/2000

(Continued)

*Primary Examiner*—Paul N. Dickson
*Assistant Examiner*—Karen J. Amores
(74) *Attorney, Agent, or Firm*—Oliff & Berridge, PLC

(57) ABSTRACT

A structure for fastening a column side member to a vehicle-body side, so as to fix a steering column relative to a vehicle body such that the column is movable in event of application of an excessively large load to the column. One of the column side member and vehicle-body side member provides a first clamped member having a slot elongated in parallel with a direction in which the column is movable, while the other of the column side member and vehicle-body side member provides a second clamped member. The structure includes: (a) a fastener including (a-1) a gripper body cooperating with the second clamped member to grip the first clamped member interposed therebetween and (a-2) a shaft body passing through the slot of the first clamped member and connected to the second clamped member and gripper body; and (b) a disk spring mounted on the shaft body of the fastener and held in a deformed state thereof, for generating a clamping force with which the first and second clamped members are fastened to each other. The disk spring has axially opposite end surfaces in the form of tapered surfaces.

20 Claims, 9 Drawing Sheets

U.S. PATENT DOCUMENTS

| | | | |
|---|---|---|---|
| 2006/0053935 A1* | 3/2006 | Sawada et al. | 74/493 |
| 2006/0082119 A1* | 4/2006 | Tinnin et al. | 280/775 |
| 2006/0097500 A1* | 5/2006 | Peppler | 280/775 |
| 2006/0151984 A1* | 7/2006 | Higashino et al. | 280/775 |
| 2006/0226646 A1* | 10/2006 | Armstrong et al. | 280/777 |
| 2006/0290128 A1* | 12/2006 | Ridgway et al. | 280/777 |
| 2007/0013183 A1* | 1/2007 | Jensen et al. | 280/777 |
| 2007/0085317 A1* | 4/2007 | Russell et al. | 280/777 |
| 2007/0137381 A1* | 6/2007 | Arihara | 74/493 |

FOREIGN PATENT DOCUMENTS

| | | |
|---|---|---|
| JP | B2 3431821 | 5/2003 |

* cited by examiner

STRUCTURE FOR FIXING STEERING COLUMN WITH FASTENER AND DISK SPRING

This application is based on Japanese Patent Application No. 2004-244666 filed on Aug. 25, 2004, the content of which is incorporated hereinto by reference.

BACKGROUND OF THE INVENTION

1. Field of the Invention

The present invention relates to a structure or fixture for fixing a steering column which constitutes a part of a vehicle steering system, relative to a vehicle body, in such a manner that the steering column is movable in the event of application of a load thereto which load is larger than a threshold.

2. Discussion of Related Art

A steering column constituting a part of a vehicle steering system is fixedly supported by a portion of a vehicle body such as a reinforcement of an instrument panel. Although the steering column should be firmly supported by the portion of the vehicle body with a high rigidity, it is desirable that the steering column is supported to be movable upon application of a load thereto whose amount corresponds to a predetermined amount, namely, the steering column is removable from the portion of the vehicle body in the event of a secondary collision between a vehicle's operator and a steering wheel which could occur as a result of a primary collision between the vehicle and another object. It is common that the steering column is fixed to the portion of the vehicle body by means of a fastening structure arranged to fasten a column side member linked to the steering column, to a vehicle-body side member linked to the portion of the vehicle body. The fastening structure is provided with an arrangement permitting the column to be movable relative to the vehicle body. Examples of the structure having such an arrangement are disclosed in JP-3431821B2 (Japanese Patent issued in 2003) and JP-2000-335430A (Japanese Patent Application laid open in 2000).

JP-3431821B2 discloses a structure in which a disk spring is used. A disk spring, in general, is capable of advantageously providing a relatively large "clamping force" (which may be referred also to as "clamping load"), in spite of its relatively small size, and accordingly serving as a preferable component constituting the structure for fixing the steering column relative to the vehicle body. However, the disk spring used in the structure of JP-3431821B2 has a sinuous shape in its axial cross section, and its complicated shape provides difficulty in its manufacturing process and increases its manufacturing cost. In this structure, therefore, there is still room for improvement enabling the structure to be more easily manufactured at a lower cost. This problem is merely one of the problems encountered in conventional structures each using a disk spring, and the conventional structures can be subjected to studies which are to be made in view of various aspects, for improving their practicability.

SUMMARY OF THE INVENTION

The present invention was made in the light of the background art discussed above. It is therefore an object of the invention to provide a structure by which a steering column is movably fixed relative to a vehicle body, and which exhibits excellent characteristics in its practical use. This object may be achieved according to the principle of this invention, which provides a structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein the structure including (a) a fastener, and (b) a disk spring which has tapered surfaces as its axially opposite end surfaces.

The disk spring with the axially opposite end surfaces in the form of the tapered surfaces can be easily manufactured at a relatively low cost, owing to simplicity in its shape. Therefore, the structure using the simply shaped disk spring is advantageous from a manufacturing point of view. In this sense, the present structure can be said to exhibit an improved practicability.

VARIOUS MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and a preferred embodiment of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiment of the invention, and that the invention may be embodied with such a possible combination with respect to the same mode.

(1) A structure for connecting or fastening a column side member linked to a steering column of a vehicle, to a vehicle-body side member linked to a portion of a body of the vehicle, so as to fix the steering column relative to the portion of the vehicle body such that the steering column is movable relative to the portion of the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, the structure including: (a) a fastener including (a-1) a gripper body cooperating with the second clamped member to grip the first clamped member which is interposed between the gripper body and the second clamped member, and (a-2) a shaft body passing through the slot of the first clamped member and connected to the second clamped member and the gripper body; and (b) a disk spring mounted on the shaft body of the fastener and held in a deformed state thereof, for generating a connecting or clamping force with which the first and second clamped members are connected or fastened to each other.

The term "steering column" recited in this mode (1) is not limited to a particular shape or construction, and may be constructed, for example, to include a shaft holding an operating member (e.g., steering wheel) attached to its longitudinal end portion, and a tube rotatably holding the shaft accommodated therein. The "portion" of the vehicle body, to which the steering column is fixed, is not particularly limited, either, and may be provided by an instrument panel reinforcement or any other component to which the column can be firmly fixed without causing any obstruction to operation of the operating member. The "column side member" and "vehicle-body side member" are members at which the column and the portion of the vehicle are fixed to each other, and are not particularly limited. For example, where the column is arranged to constitute a part of the vehicle body by connecting or fastening together two brackets which are provided in the column and the instrument panel reinforcement, respectively, each of the "column side member" and "vehicle-body side member" are provided by a portion or entirety of a corresponding one of the two brackets.

The column is fixedly supported in such a manner that the column is movable relative to the portion of the vehicle body in the event of application of an excessively large load to steering column, which could be caused, for example, by a second collision between a vehicle's operator and the operating member which is held by the column. The movement of the column herein should be interpreted to mean not only displacement of the entirety of the column but also displacement of a portion of the column. For example, where the column includes a telescopic portion which is provided by its portion close to the operating member and at which the column is fixed relative to the vehicle body, the column is movable in a forward direction of the vehicle, only at the telescopic portion owing to its telescopic motion. Such a movement of the local portion of the column is included in the movement of the column recited in this mode (1).

The column side member and the vehicle-side member are connected or fastened to each other such that they are movable relative to each other. One of the two members has the slot for defining or limiting the direction in which the two members are movable relative to each other. One of the two members having the slot is referred to as the "first clamped member", while the other of the two members is referred to as the "second clamped member", so that the two members are distinguishable from each other. The first clamped member may be provided by either one of the two members. Namely, the slot may be formed in either one of the two members. The slot formed in the first clamped member may take the form of elongated hole, cutout or otherwise shaped aperture permitting the shaft body of the fastener to pass therethrough so as to guide the shaft body in the direction in which the slot is elongated. It is noted that the second clamped member as well as the first clamped member may have a slot or aperture permitting the shaft body to pass therethrough. In this case, it is preferable that the aperture formed through the second clamped member is arranged to inhibit or restrict displacement of the shaft body in its radial direction or in a direction perpendicular to its axis, for simplifying the construction of the structure.

The "fastener" may be provided by any one of various kinds of fastener such as a rivet and a set of screw bolt and nut. Where a set of screw bolt and nut is employed as the fastener, the "shaft body" may be provided by a rod portion of the bolt while the "gripper body" may be provided by a portion constituting a part of the set of screw bolt and nut. In this case, which part of the set of screw bolt and nut provides the "gripper body" differs depending upon, for example, a shape of the bolt and a relationship between the nut and the clamped members. FIGS. 1A-1D are views conceptually illustrating various arrangements (employable in the structure) in each of which two plate members as the first and second clamped members are clamped or fastened by a set of screw and nut as the fastener. An upper one of the two plate members represents the second clamped member while a lower one of the two plate members represents the first clamped member having the slot SL in each of the arrangements of FIGS. 1A-1D, which will be described below in detail with reference to the drawings.

In the arrangement of FIG. 1A, the second clamped member PL2 has a hole formed therethrough, and the bolt BT is arranged to pass through the first and second clamped members PL1, PL2, by introducing its rod portion R as the shaft body into the hole of the second clamped member PL2 and the slot SL of the first clamped member PL1, from one of opposite sides of the second clamped member PL2 that is remote from the first clamped member PL1. The nut N having an internal thread formed therein is screwed onto an external thread formed on a distal end portion of the rod portion R of the bolt BT. In this arrangement in which the nut NT serves as the gripper body, the bolt BT is held in engagement at its head portion H with the second clamped member PL2, and is screwed at its rod portion R into the nut NT, so that the rod portion R of the bolt BT is connected to the second clamped member PL2 and the nut NT.

In the arrangement of FIG. 1B, the bolt BT consists of a stud bolt having no head portion, and is attached at its proximal end portion to the second clamped member PL2 so as to extend from the second clamped member PL2 in a direction perpendicular to a plane of the second clamped member PL2. The bolt BT is arranged to pass through the slot SL of the first clamped member PL 1, while the nut NT is screwed onto the external thread formed on the distal end portion of the rod portion R of the bolt BT. In this arrangement in which the nut serves as the gripper body, the bolt BT is fixed at its rod portion R to the second clamped member PL2, and is screwed at its rod portion R into the nut NT, so as to be connected to the second clamped member PL2 and the nut NT.

In the arrangement of FIG. 1C, the second clamped member PL2 has the hole formed therethrough, and the bolt BT is arranged to pass through the first and second clamped members PL1, PL2, by introducing its rod portion R into the slot SL of the first clamped member PL1 and the hole of the second clamped member PL2, from one of opposite sides of the first clamped member PL1 that is remote from the second clamped member PL2. The nut NT is screwed onto the external thread formed on the distal end portion of the rod portion R of the bolt BT. In this arrangement in which the head portion H of the bolt BT serves as the gripper body, the bolt BT is held in engagement with the second clamped member PL2 through the nut NT which is screwed onto the external thread of the rod portion R of the bolt BT, so that the rod portion R of the bolt BT is connected to the second clamped member PL2 as well as to the head portion H. Further, in this arrangement, the nut NT may be considered to constitute a portion of the second clamped member PL2, since the nut NT is held in close contact with the second clamped member PL2 after being tightly screwed onto the external thread of the rod portion R. In this sense, the second clamped member PL2 may be considered to provide an internally threaded member in this arrangement, as in the arrangement of FIG. 1D which will be described below.

In the arrangement of FIG. 1D, the second clamped member PL2 has a boss portion through which an internally threaded hole (tapped hole) is formed. That is, the boss portion of the second clamped member PL2 serves as the nut NT, and the second clamped member PL2 provides the internally threaded member, as in the above-described arrangement of FIG. 1C. The bolt BT is arranged to pass through the first member PL1, by introducing its rod portion R into the slot SL of the first clamped member PL1, from one of opposite sides of the first clamped member PL1 that is remote from the second clamped member PL2. The external thread formed on the distal end portion of the rod portion R of the bolt BT is screwed into the internal threaded hole of the boss portion of the second clamped member PL2. In this arrangement in which the head portion H of the bolt BT serves as the gripper body, the bolt BT is held in thread engagement with the second clamped member PL2, so that the rod portion R of the bolt BT is connected to the second clamped member PL2 as well as to the head portion H.

There are variety of arrangements such as the above-described arrangements of FIGS. 1A-1D which are different in relationship between the first and second clamped members and the fastener and which are employable in the structure of the present mode (1). It is therefore possible to select, in each case, a suitable one from among the variety of arrangements which establishes the relationship desired in the case.

The "shaft body connected to the second clamped member and the gripper body" is interpreted to mean that the shaft body is inhibited from being moved relative to each of the second clamped member and the gripper body in the axial direction, or that the shaft body is inhibited from being moved relative to each of the second clamped member and the gripper body in the axial direction while the first and second clamped members are being clamped or fastened to each other by the fastener. The shaft body may be connected to each of the second clamped member and the gripper body, by screw-tightening, engaging, fixing, bonding, integrating or any otherwise connecting to each of the second clamped member and the gripper body. It is therefore possible to connect the shaft body to each of the second clamped member and the gripper body by means suitable for, for example, the arrangement of the fastener.

The shaft body is arranged to pass through a hole of the "disk spring", so that the disk spring is mounted on a portion of the shaft body, which portion is not particularly limited. In the arrangement of FIG. 1A, the disk spring may be disposed between the head portion H of the bolt BT and the second clamped member PL2, between the second and first clamped members PL2 and PL1, or between the first clamped member PL1 and the nut NT as the gripper body. In the arrangement of FIG. 1B, the disk spring may be disposed between the second and first clamped members PL2 and PL1, or between the first clamped member PL1 and the nut NT as the gripper body. In the arrangement of FIG. 1C, the disk spring may be disposed between the nut NT and the second clamped member PL2, between the second and first clamped members PL2 and PL1, or between the first clamped member PL1 and the head portion H of the bolt BT as the gripper body. In the arrangement of FIG. 1D, the disk spring may be disposed between the second and first clamped members PL2 and PL1, or between the first clamped member PL1 and the head portion H of the bolt BT as the gripper body.

The term "connecting or clamping force", at which the first and second clamped members are connected or fastened to each other, is interpreted to mean a force resisting a relative movement of the first and second clamped members, i.e., a relative movement of the steering column and the vehicle body.

(2) The structure according to mode (1), wherein the disk spring has axially opposite end surfaces in the form of tapered surfaces.

The disk spring defined in this mode (2) is an interposed member which is shaped, for example, as shown in FIG. 2. That is, each of the tapered surfaces as the axially opposite end surfaces of the disk spring is represented by two straight lines in cross section taken in any plane containing an axis of the disk spring, and each of the two straight lines is equally inclined to a direction perpendicular to the axis. The disk spring defined in this mode (2) is symmetric with respect to the axis, and has the tapered surfaces as the axially opposite end surfaces each of which extends straight in a direction inclined with respect to the radial direction, unlike a disk spring as shown in FIG. 3A which has axially opposite end surfaces each of which has a curved or sinuous shape in its cross section, and a disk spring like a wave washer as shown in FIG. 3B. In the following description, the disk spring defined in this mode (2) will be referred simply to as "tapered disk spring".

The tapered disk spring can be easily manufactured at a relatively low cost, owing to simplicity in its shape. Therefore, the structure using the simply shaped disk spring is advantageous from a manufacturing point of view, thereby exhibiting an improved practicability. The simplicity of the shape leads to reduction in variation of dimensions of the manufactured disk spring, thereby making it possible to stabilize the clamping force generated by the disk spring. In view of such a stabilization in the clamping force, the structure with the tapered disk spring can exhibit an improved practicability.

(3) The structure according to mode (1) or (2), wherein the disk spring forced against at least one of the first and second clamped members is plastically deformed.

While being deflected or deformed by force applied thereto in the axial direction, the disk spring generates a restoring force which serves as the clamping force. In general, a disk spring is used in an arrangement in which it is elastically deformed without being plastically deformed. However, by suitably designing its shape and selecting its material, for example, the disk spring can be adapted to be elastically deformed while being deformed by a small amount and to be plastically deformed while being deformed by an amount exceeding a predetermined threshold. That is, the disk spring can be selectively placed in its elastic deformation region and plastic deformation region. A rate of change (i.e., gradient) of the clamping force with respect to change of the deformation amount is lower while the disk spring is in the plastic deformation region than while the disk spring is in the elastic deformation region. It is therefore possible to reduce variation in the clamping force generated by the disk spring in an arrangement in which the disk spring is held in its plastic deformation region, even in presence of variation in an operating amount of the fastener, i.e., in a tightening amount which is, for example, defined by a distance between the gripper body and the second clamped member. That is, the structure constructed according to this mode (3) is given an improved practicability, owing to its capability of effectively absorbing the variation in the operating or tightening amount of the fastener. As described later in more detail, where the disk spring is provided by the above-described tapered disk spring, the change of the clamping force in the plastic deformation region can be made substantially zero, so that the structure is given a further improved practicability.

(4) The structure according to any one of modes (1)-(3), wherein the disk spring forced against at least one of the first and second clamped members is deformed without being crushed or flattened or without causing its axially opposite end surfaces to be perpendicular to an axis of the disk spring.

With an increase of force acting on the disk spring, the disk spring is brought into a so-called "setting state" in which the disk spring is crushed or flattened. With further increase of the force acting on the flattened disk spring, the clamping force produced by the fastener becomes larger than the force generated by characteristics of the disk spring. In this stage after the setting state, the rate of change of the claming force becomes extremely high, resulting in large variation in the clamping force in presence of variation in the operating amount of the fastener. In the structure of this mode (4) in which the disk spring is forced without being crushed or flattened, namely, without being brought into the stetting state, it is possible to reduce variation in the clamping force, thereby enabling the structure to exhibit an improved practicability.

(5) The structure according to any one of modes (1)-(4), further including a deformation amount limiter which limits an amount of deformation of the disk spring.

In the structure of this mode (5), the amount of deformation of the disk spring is limited whereby the variation of the clamping force can be made relatively small. It is noted that the deformation amount limiter may include an operating amount limiter arranged to limit the operating or tightening amount of the fastener. The operating amount limiter may be provided by a limiter (such as a tubular collar defined in mode (8) which is described below) which is arranged to limit a distance between the second clamped member and the gripper body.

(6) The structure according to any one of modes (1)-(5), further including a plate member, wherein the disk spring is interposed between the first clamped member and one of the gripper body and the second clamped member, and wherein the plate member is interposed between the first clamped member and the disk spring, and is held in contact with the first clamped member.

Whenever the first and second clamped members are moved relative to each other, the disk spring and the first clamped member are moved relative to each other. In an arrangement in which the disk spring is interposed between the first clamped member and the gripper body or between the first clamped member and the second clamped, namely, in which the disk spring is disposed to be adjacent to the first clamped member, there is risk that the disk spring might bite the first clamped member, when the first and second clamped members are moved relative to each other. Such a biting action of the disk spring against the first clamped member impedes the relative movement of the disk spring and the first clamped member, thereby possibly disabling the steering column from being smoothly moved relative to the portion of the vehicle body. However, in the structure defined in this mode (6) in which the plate member is interposed between the first clamped member and disk spring, since the interposed plate member prevents the disk spring from biting the first clamped member, the smooth movement of the column relative to the vehicle body is assured, so that the structure of this mode (6) exhibits an improved practicability. It is noted that a degree of biting of the disk spring onto the first clamped member varies depending upon, for example, the shape of the disk plate. In this sense, the technical advantage given by this mode (6) is significant particularly in an arrangement with the above-described tapered disk spring whose outer peripheral edge could bite into the surface of the first clamped member by a large degree, in absence of the interposed plate member.

(7) The structure according to mode (6), wherein the plate member has a hole formed therethrough, and is mounted on the shaft body of the fastener with a second radial clearance therebetween that is smaller than a first radial clearance between the shaft body and the disk spring which is mounted on the shaft body, and wherein the plate member has a disk-spring position limiter portion provided by an outer peripheral portion thereof and limits a radial position of the disk spring relative to the shaft body.

If the position of the disk spring were deviated from that of the shaft body of the fastener in the radial direction, namely, if the axis of the disk spring were misaligned with respect to the axis of the shaft body, such a deviation or misalignment could affect the characteristic of the structure. Depending upon a relationship between the disk spring and the other component or components of the structure, the deviation or misalignment could cause the disk spring to be gripped or held with its posture being inclined with respect to a plane perpendicular to the axis of the shaft body, and accordingly disabling the disk spring from being deformed evenly as viewed in its circumferential direction. An uneven deformation of the disk spring is likely to impede generation of a suitable amount of clamping force and/or smooth movement of the first and second clamped members relative to each other. However, such a problem is avoided in the structure defined in this mode (7) in which the positional deviation of the disk spring from the shaft body in the radial direction is restrained by the disk-spring position limiter portion of the plate member. The disk-spring position limiter portion, which is provided by the outer peripheral portion of the plate member, may take the form of an axial projection projecting from a main body of the plate member in the axial direction away from the first clamped member, by a predetermined axial distance, so that the axial projection serves as a stopper which is arranged such that the disk spring can be brought into abutting contact at its outer periphery with the stopper. The axial projection and the main body of the plate member may be provided by respective members which are attached to each other, or alternatively, may be provided by a single member. In the latter case, the axial projection may be constituted by at least a part of the outer peripheral portion of the member which is bent toward the axial direction away from the first clamped member. It may be interpreted that a relationship or difference between the first radial clearance (between the shaft body and the disk spring) and the second radial clearance (between the shaft body and the plate member) is equivalent to that between a radial clearance between the collar and the disk spring and a radial clearance between the collar and the plate member.

(8) The structure according to mode (6) or (7), further including a tubular collar which is mounted on the shaft body and which passes through the slot of the first clamped member, a hole of the disk spring and a hole of the plate member, wherein the tubular collar is held in contact at an axially opposite ends thereof with the second clamped member and the gripper body, so as to limit a distance between the second clamped member and the gripper body.

In the structure of this mode (8), the operating amount of the fastener can be stabilized owing to the tubular collar, whereby the variation of the clamping force can be minimized. The tubular collar serves as the above-described operating amount limiter which limits the operating amount of the fastener, i.e., an amount by which the first and second clamped members are fastened to each other. Further, it can be said that the tubular collar serves also as the above-described deformation amount limiter which limits the amount of deformation of the disk spring.

(9) The structure according to mode (8), wherein the tubular collar includes a flange portion provided by an axial end portion thereof, and wherein the disk spring is interposed between the flange portion and the plate member.

In the structure of this mode (9), the disk spring is not in direct contact with the first clamped member due to presence of the plate member interposed therebetween, and the disk spring is not in direct contact with the second clamped member or the gripper body due to presence of the flange portion of the tubular collar interposed therebetween. Thus, the disk spring is prevented from biting the second clamped member or the gripper body. This arrangement facilitates, where the fastener is provided by a set of screw bolt and nut, an operation to wrench or tighten the fastener.

(10) The structure according to mode (9), wherein the tubular collar, passing through the hole of the plate member, is fixed to the plate member by an interference fit between the tubular collar and the hole of the plate member.

In the structure of this mode (10), the disk spring is interposed between the plate member and the flange portion of the tubular collar, and the tubular collar is interference-fitted in the plate member. This arrangement makes it possible to prepare, prior to an operation to fix the steering column to the portion of the vehicle body, an intermediate sub-assembly which is constituted by the tubular collar, disk spring and plate member. The fixing operation with use of the prepared sub-assembly can be carried out more simply and easily than in case where the three members (i.e., the tubular collar, disk spring and plate member) are mounted one by one on the shaft body of the fastener. Further, the preparation of the sub-assembly is effective to prevent any one of the three members from failing to be mounted on the shaft body in process of fixing the steering column to the portion of the vehicle body, i.e., in process of assembling the structure. Thus, the structure provides an improved practicability which advantageously facilitates the operation to assemble the structure. It is noted that, where an arrangement as described above in mode (3) (in which the disk spring forced against the first and/or second clamped member is plastically deformed) is intended to be established with preparation of the above-described assembly, it is preferable that the disk spring maintains its original shape without being deformed when the sub-assembly is prepared, namely, before the disk spring of the sub-assembly is mounted on the shaft body of the fastener so as to be forced against the first and/or second clamped member.

(11) The structure according to mode (9) or (10), further including a resin-made spacer having a boss portion and a hole which is formed through the boss portion, and mounted on the shaft body of the fastener, wherein the tubular collar is held in contact at the flange portion and another axial end portion with the gripper body and the second clamped member, respectively, wherein the disk spring is gripped between the plate member and the flange portion of the tubular collar which are interposed between the first clamped member and the gripper body, wherein the resin-made spacer is fitted at the boss portion thereof in the slot of the first clamped member, and is held in contact at opposite side surfaces thereof with the first and second clamped members which cooperate with each other to grip the resin-made spacer, and wherein the tubular collar is fitted in the hole of the resin-made spacer.

In the structure of this mode (11), the rein-made spacer held between the first and second clamped members serves to facilitate the first and second clamped members to be smoothly moved relative to each other. Further, since the boss portion of the resin-made spacer is arranged to be fitted in the slot of the first clamped member, it is possible to limit a relative position of the first and second clamped members, specifically, in a direction intersecting the direction in which the slot is elongated, thereby making it possible to improve accuracy at which the steering column is attached to the portion of the vehicle body.

(12) The structure according to mode (11), wherein the tubular collar, fitted in the hole of the resin-made spacer, is fixed to the rein-made spacer by an interference fit between the tubular collar and the hole of the resin-made spacer.

According to the feature recited in this mode (12), where an operation to mount the tubular collar onto the shaft body of the fastener is made by moving the tubular collar upward from a lower side of the shaft body, namely, with the flange portion of the tubular collar being located on a lower side of the above-described another axial end portion, the tubular collar can be prevented from dropping or being removed from the shaft body in the operation. Thus, the operation can be efficiently carried out.

(13) A fixture for fixing a steering column of a vehicle relative to a body of the vehicle such that the steering column is movable relative to the vehicle body in event of application of an excessively large load to the steering column, the fixture including: (A) a first clamped member which is linked to one of the steering column and a portion of the vehicle body and which has a slot formed therein and elongated in an elongated direction parallel to the direction in which the steering column is movable; (B) a second clamped member which is linked to the other of the steering column and the portion of the vehicle body; and (C) the structure defined in mode (11) or (12), wherein the slot of the first clamped member has (i) a relative-position limiter portion in which the boss portion of the resin-made spacer is fitted for limiting a position of the first clamped member relative to the second clamped member, and (ii) a movement allower portion extending from the relative-position limiter portion in the elongated direction and having a width smaller than an outside diameter of the boss portion and larger than an outside diameter of the tubular collar which is mounted on the shaft body of the fastener, and wherein the fastener fastens the first and second clamped members to each other, with the boss portion being fitted in the relative-position limiter portion, and allows movement of the shaft body along the movement allower portion so as to allow the first clamped member to be moved relative to the second clamped member in the elongated direction in event that the steering column receives a load larger than a threshold and causing deformation of the boss portion which permits the boss portion to be moved from the relative-position limiter portion to the movement allower portion.

In the fixture defined in this mode (13), it is possible to effectively limit the relative position of the first and second clamped members, specifically, in the elongated direction (in which the slot is elongated) as well as in the direction intersecting the elongated direction. This feature leads to further improvement in the accuracy at which the steering column is attached to the portion of the vehicle body, and also to further increase in efficiency in the operation to fix the steering column to the portion of the vehicle body. Further, since the spacer having the boss portion is made of a resin material, the spacer can be adapted to be easily deformable. In the present fixture, therefore, the spacer can be arranged such that the relative movement of the first and second clamped members is not impeded by deformation of the boss portion of the spacer.

(14) The structure according to any one of modes (1)-(12), wherein the shaft body is provided by an externally threaded member tightly screwed into an internally threaded member provided by one of the gripper and the second clamped member which are connected to each other through the shaft body, and wherein the disk spring is mounted on the shaft body of the fastener, while being forced against at least one of the first and second clamped members, by thread engagement between the externally and internally threaded members.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

There will be described one embodiment of the present invention in the form of a fastening structure, by reference to the accompanying drawings. It is to be understood that the present invention is not limited to the following embodiment, and may be otherwise embodied with various changes and modifications, such as those described in the foregoing "VARIOUS MODES OF THE INVENTION", which may occur to those skilled in the art.

[Overall Construction of Steering System]

Figure 1A:
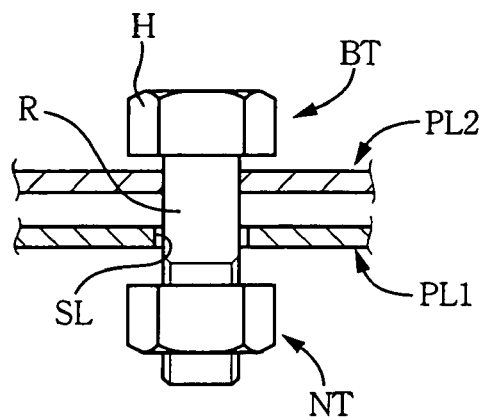
FIGS. 1A-1D are views conceptually illustrating various arrangements (employable in a fastening structure according to the invention) in each of which two plate members as first and second clamped members are fastened by a set of screw and nut as a fastener.
Figure 1B:
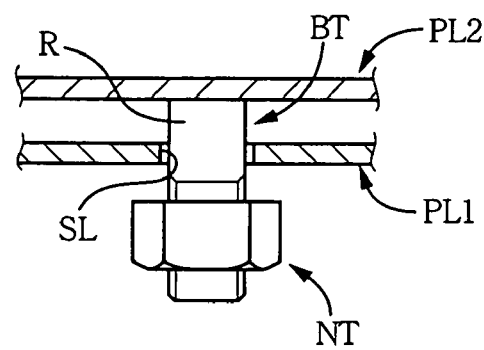
Figure 1C:
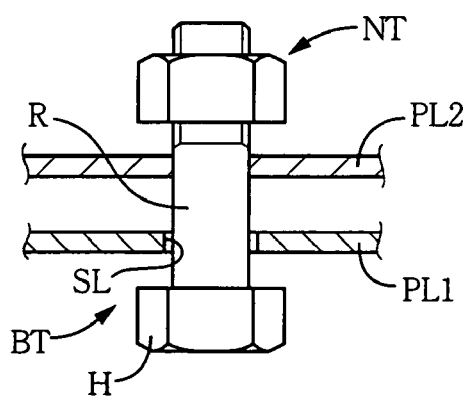
Figure 1D:
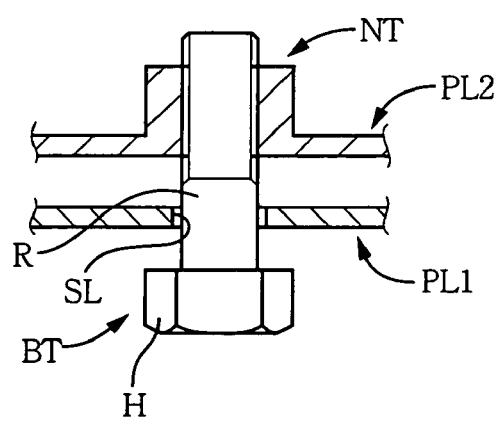
Figure 2:
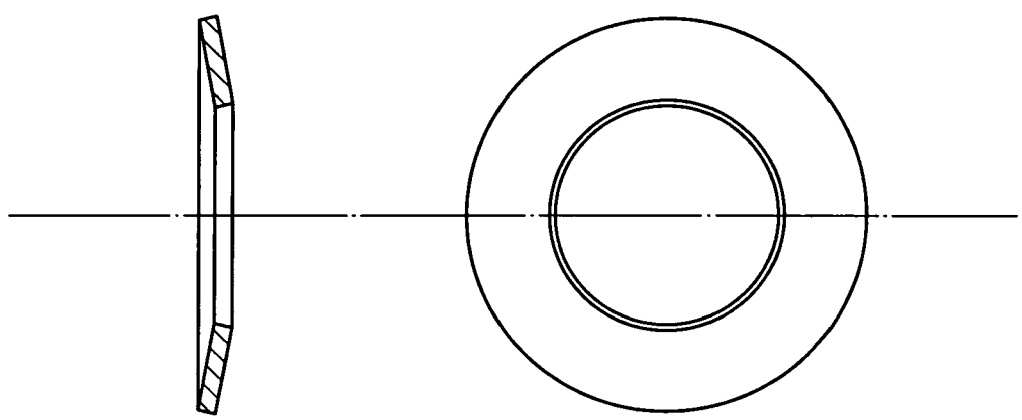
FIG. 2 is a set of views (i.e., a front view and an axial cross sectional view) showing a tapered disk spring which has axially opposite end surfaces in the form of tapered surfaces.
Figure 3A:
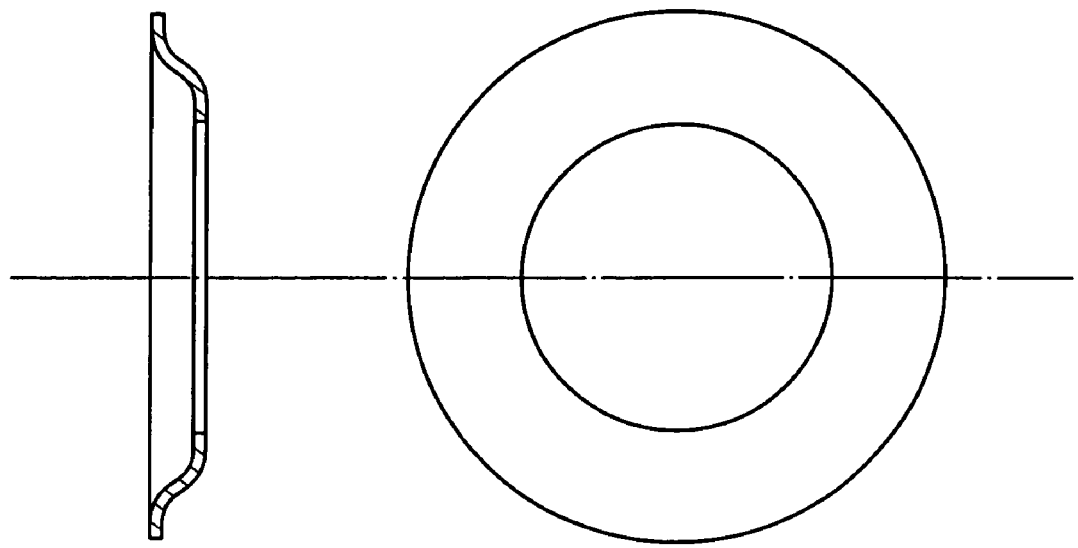
FIG. 3A is a set of views (i.e., a front view and an axial cross sectional view) showing a disk spring which is different in shape from the tapered disk spring of FIG. 2.
Figure 3B:
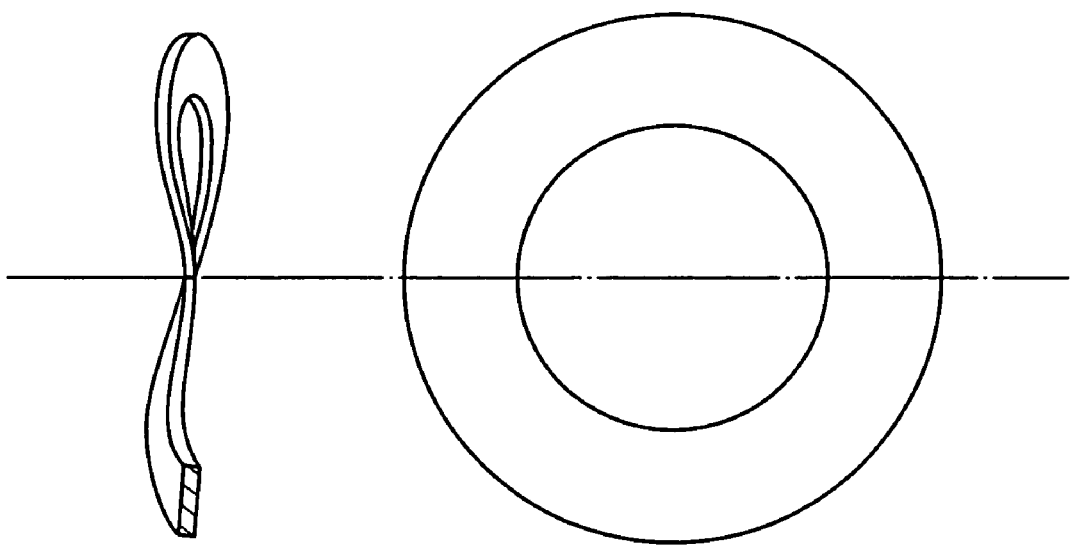
FIG. 3B is a set of views (i.e., a front view and an axial cross sectional view) showing another disk spring which is different in shape from the tapered disk spring of FIG. 2.
Figure 4:
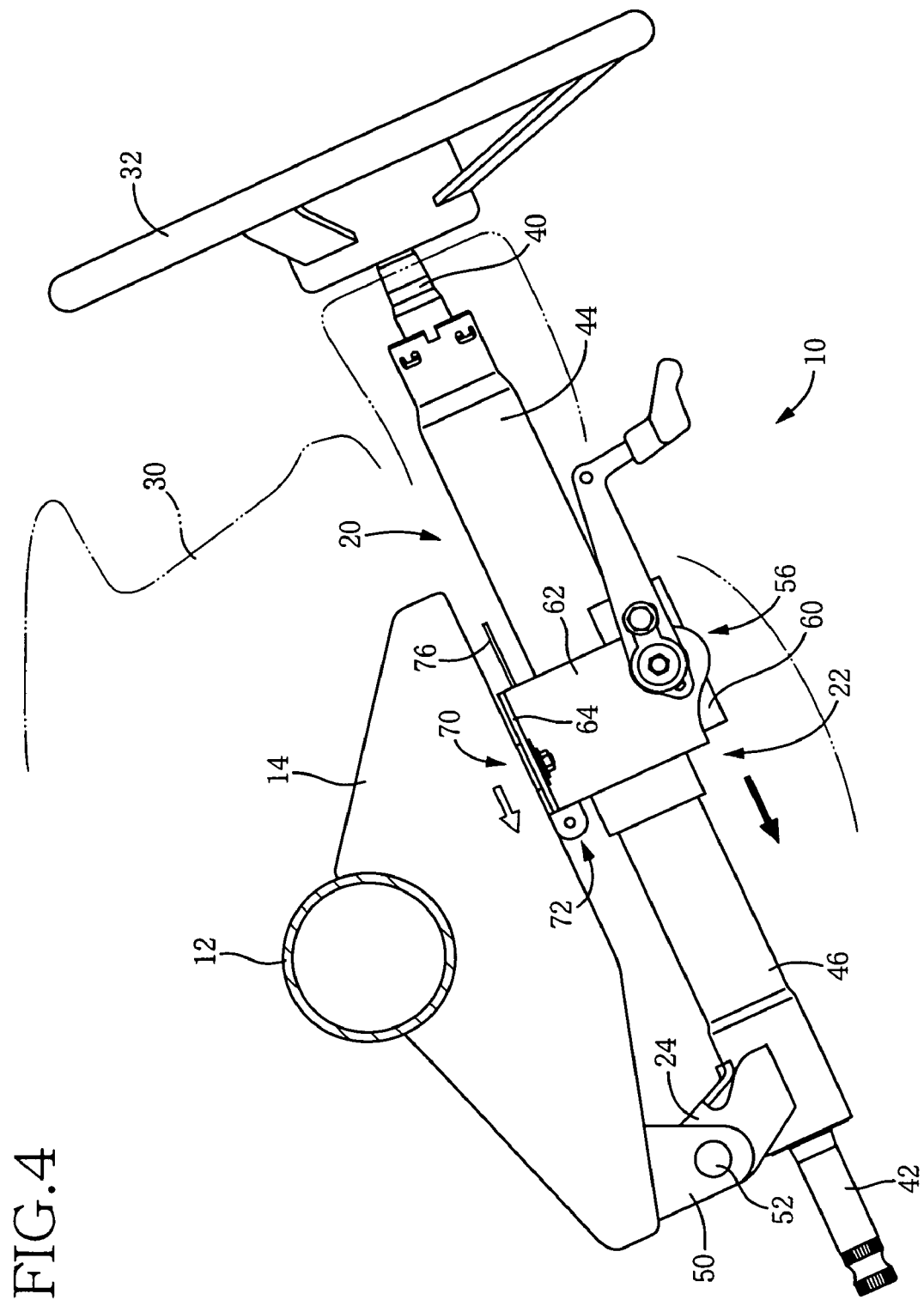
FIG. 4 is a view showing an entirety of a steering system incorporating therein a fastening structure which is constructed according to an embodiment of the invention.

Referring first to FIG. 4, there will be described an overall construction of a steering system which is to be installed in a vehicle and which incorporates therein the fastening structure constructed according to an embodiment of the invention. This steering system is constituted principally by a steering column 10 fixed to an instrument panel reinforcement 12 as a portion of a body of the vehicle through a pair of attachment brackets 14 which are spaced apart from each other in a transverse direction of the vehicle and which are fixed to the instrument panel reinforcement 12. The steering column 10 thus supported by the instrument panel reinforcement 12 has an inclined posture such that its front portion is located on a lower side of its rear portion. The column 10 is constructed to include a main body 20, a breakaway bracket (B.A.BKT) 22 which is provided on an axially intermediate portion of the main body 20, and a front bracket 24 which is provided on a front portion of the main body 20. The breakaway bracket 22 and the front bracket 24 are attached to the attachment brackets 14, so that the column 10 is supported at its two portions. The rear portion of the thus supported column 10 projects from an instrument panel 30 in a reverse direction of the vehicle. To a distal end of the rear portion of the column 10, there is attached a steering operating member in the form of a steering wheel 32, such that the steering wheel 32 is rotatably or operably supported by the column 10. The column 10 is connected at its front end portion to a steering device (not shown) located outside a passenger's compartment of the vehicle, via an intermediate shaft (not shown).

The main body 20 of the column 10 includes a steering shaft, and a tubular body supporting the steering shaft which is arranged to pass therethrough. The steering shaft includes a rear shaft 40 and a front shaft 42 which is positioned on a front side of the rear shaft 40, while the tubular body includes a rear tube 44 and a front tube 46 which is positioned on a front side of the rear tube 44. The rear and front shafts 40, 42 are rotatably supported by the rear and front tubes 44, 46, respectively. The steering shaft and the tubular body are adapted to be telescopic (i.e., expandable and contractible), so that the main body 20 is telescopic as a whole.

Figure 5:
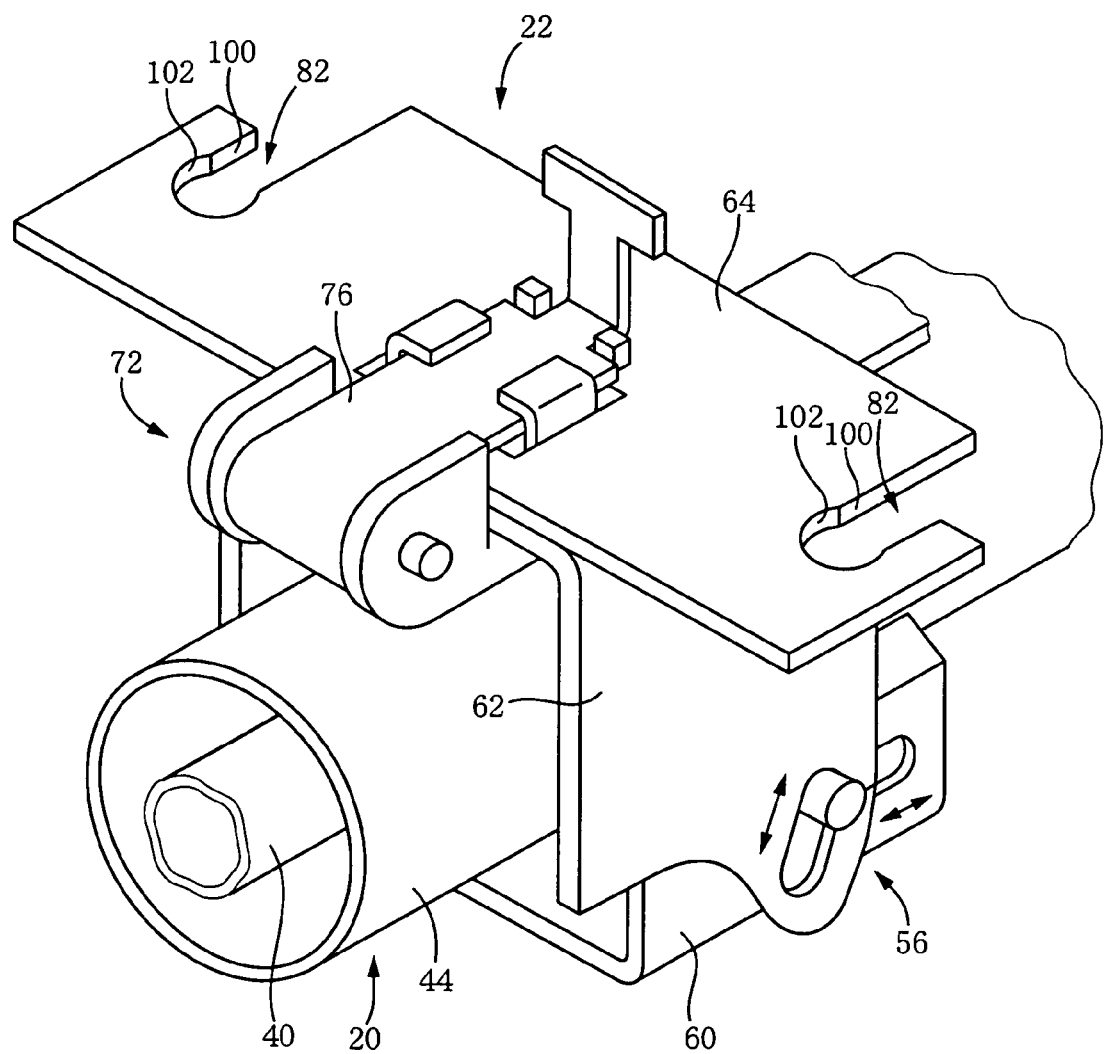
FIG. 5 is a perspective view showing a breakaway bracket which constitutes a part of a steering column of the steering system of FIG. 4.

The main body 20 of the column 10 is attached at the rear and front tubes 44, 46 to the portion of the vehicle body. The front bracket 24 is fixed to a front end portion of the front tube 46, and is connected through a support shaft 52 to shaft receiver members 50 which are fixed to the respective attachment brackets 14, so that the column 10 is rockably supported by the portion of the vehicle body. Meanwhile, the rear tube 44 is held by the breakaway bracket 22 through a tilt/telescopic mechanism 56, and the breakaway bracket 22 is attached to the attachment brackets 14, so that the rear tube 44 is fixedly supported by the portion of the vehicle body. Described more specifically, with reference to FIG. 5 that is a perspective view of the breakaway bracket 22, the rear tube 44 is fixedly received in a tube receiver member 60 which is held by an inverted U-shaped holder member 62 as a component of the breakaway bracket 22. The holder member 62 is connected to a clamped plate 64 as another component of the breakaway bracket 22 which is fastened to the attachment brackets 14, so that the rear tube 44 is fixedly supported by the portion of the vehicle body. The fastening structure 70 constructed according to the embodiment of the invention is used for the fastening or connection of the breakaway bracket 22 and the attachment brackets 14.

The fastening structure 70 is constructed such that the breakaway bracket 22 is movable in the axial direction of the steering column 10 relative to the attachment brackets 14 fixed to the instrument panel reinforcement 12 in the event of a secondary collision between a vehicle's operator and the steering wheel 32, namely, in the event of application of impact to the steering wheel 32 from the vehicle's operator. In the present steering system, when the breakaway bracket 22 is moved relative to the attachment brackets 14, the rear portion of the column 10 (hereinafter referred to as "column movable portion" where appropriate) together with the breakaway bracket 22 is moved in the axial direction of the column 10 relative to the portion of the vehicle, and is removed from the portion of the vehicle body. It is noted that the rear portion of the column 10, i.e., the column movable portion is constituted by a rear portion of the main body 20 including the rear shaft 40 and the rear tube 44.

After its removal from the portion of the vehicle body, the column movable portion is further moved in the forward direction of the vehicle. The present steering system is equipped with an energy absorber 72 which is arranged to effectively absorb an energy generated by the secondary collision, during the movement of the column movable portion in the forward direction. The energy absorber 72 includes a U-shaped plate 76 (see FIG. 5) which is deformable to generate an energy absorbing load serving to absorb the energy generated by the collision. The U-shaped plate 76 of the energy absorber 72 has an upward projection provided in its end portion. The upward projection of the U-shaped plate 76 is brought into engagement with an engager (not shown) provided in the attachment brackets 14, upon removal of the column movable portion from the portion of the vehicle body. The U-shaped plate 76 is deformed by a front end portion of the breakaway bracket 22, as a result of the movement of the column movable portion with the upward projection of the U-shaped plate 76 held in engagement with the engager. That is, the U-shaped plate 76 generates the energy absorbing load as a load required for the deformation.

[Fastening Structure]

Figure 6:
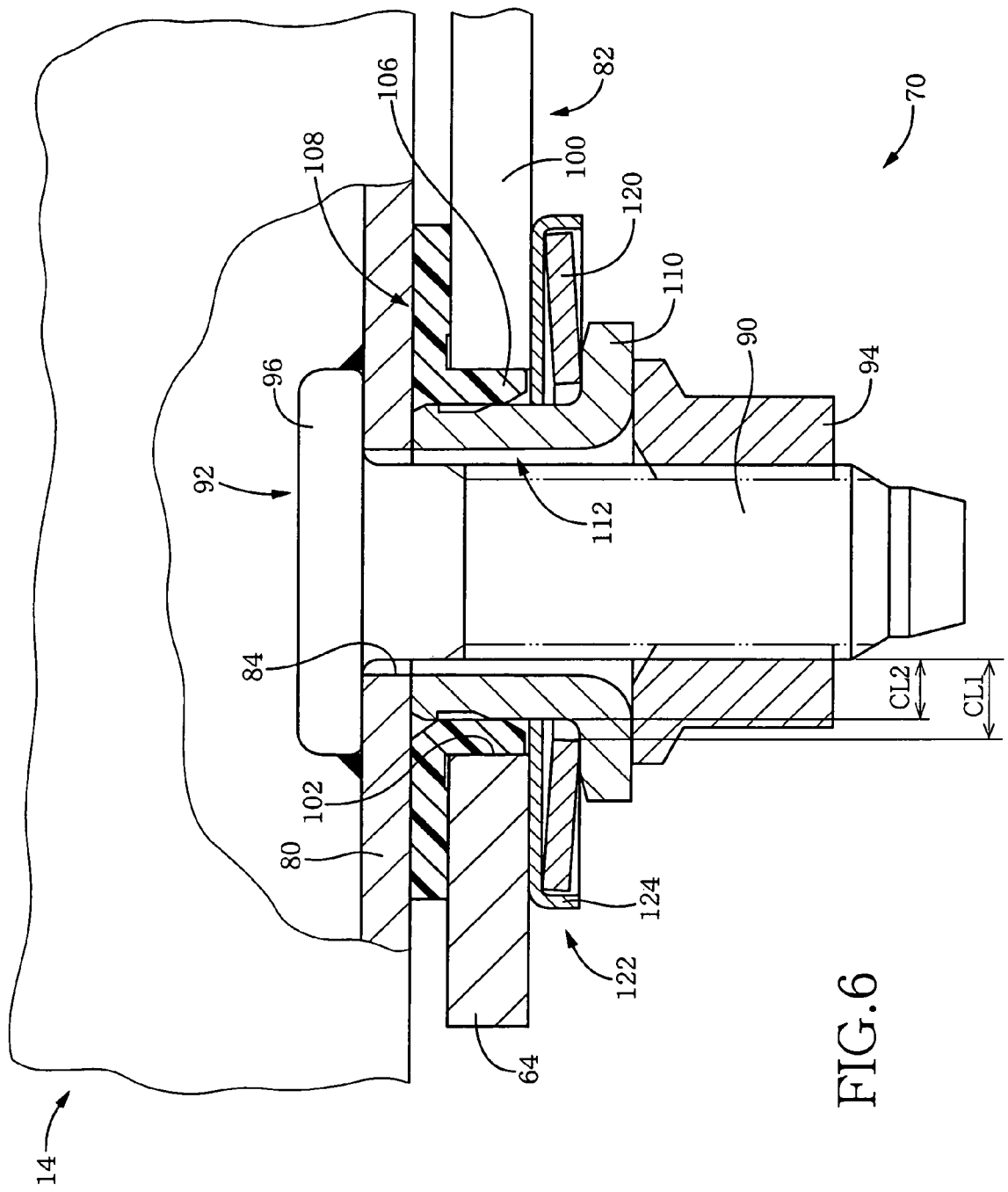
FIG. 6 is a cross sectional view showing the fastening structure constructed according to the embodiment of the invention.
Figure 7:
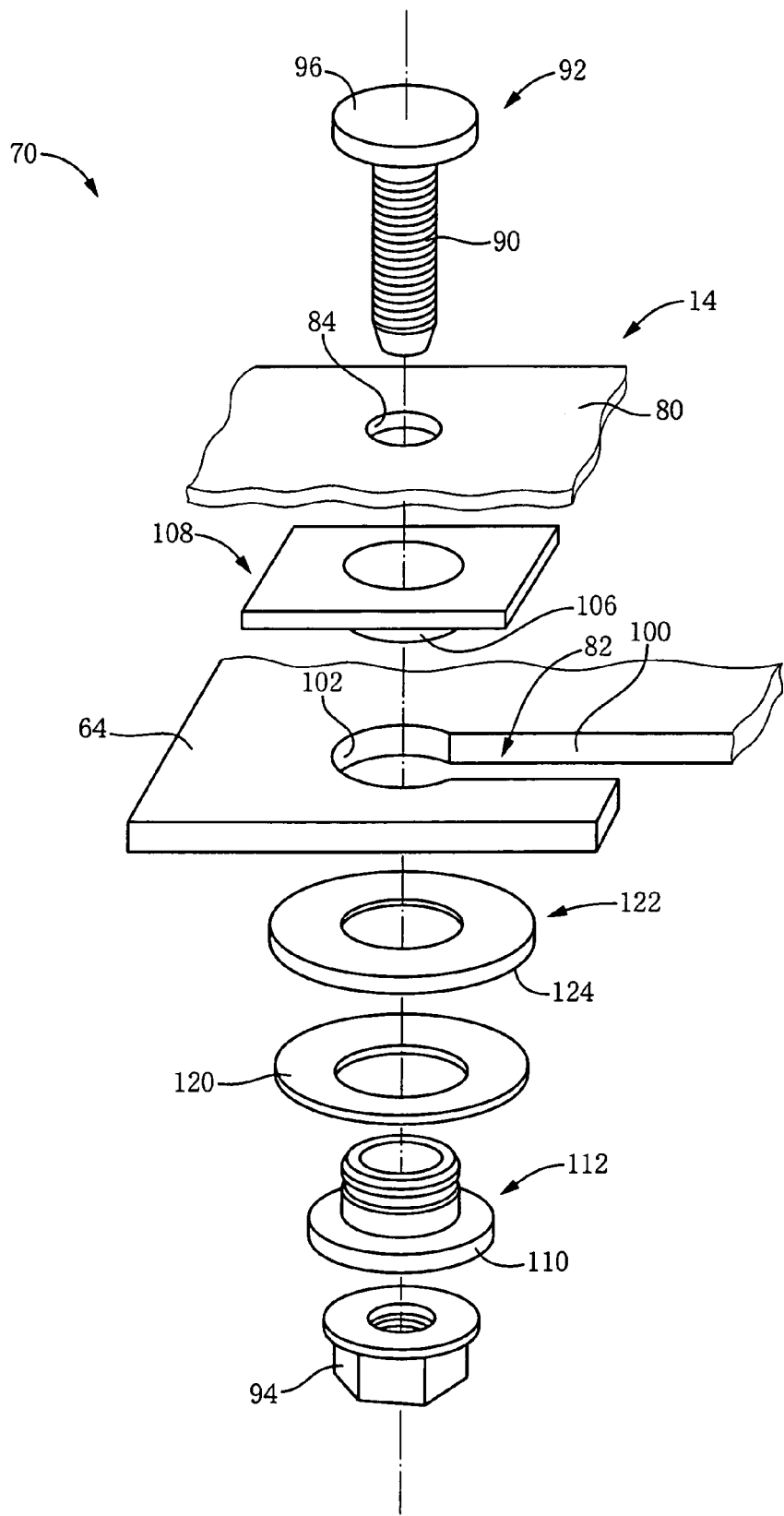
FIG. 7 is a perspective and exploded view showing the fastening structure of FIG. 6.
Figure 8:
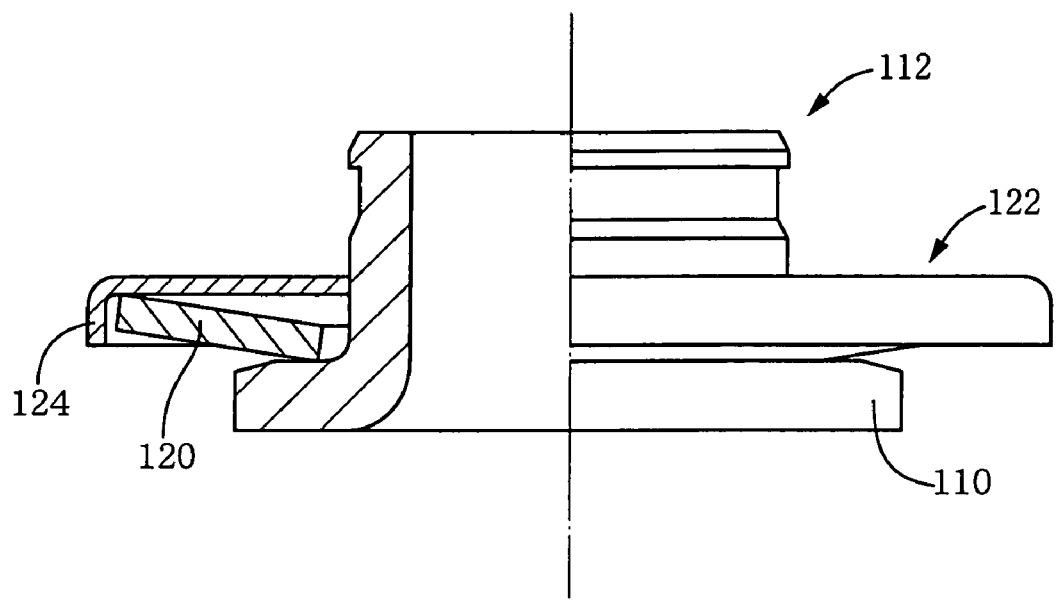
FIG. 8 is a view partially in cross section of a subassembly which is prepared during manufacture of the fastening structure of FIG. 6 and which is constituted by a washer, a collar and the disk spring.

Referring next to FIGS. 6-8, the fastening structure 70 constructed according to the embodiment of the invention will be described in detail. The fastening structure 70 is arranged to fasten end portions of the clamped plate 64 of the breakaway bracket 22 (that are opposite to each other in the transverse direction of the vehicle), to lower walls 80 of the respective attachment brackets 14. Described specifically, the clamped plate 64 as a column side member linked to the steering column 10 has slots 82 formed through in the respective opposite end portions. Each of the slots 82 is elongated in the axial direction of the column 10, and extends from an intermediate portion of the clamped plate 64 up to a rear end of the plate 64 in the reverse direction of the vehicle, so as to open in a rear end surface of the plate 64 as well as in upper and lower surfaces of the plate 64. The lower walls 80 of the attachment brackets 14, each serving as a vehicle-body side member linked to the portion of the vehicle body, have respective round holes 84 formed therethrough. Two bolts 92 are provided to pass through the respective slots 82 and holes 84, and two flanged nuts 94 are provided to be tightly screwed onto external threads which are formed on rod portions 90 of the respective bolts 92, so that the clamped plate 64 is fastened at its opposite end portions (which are opposite to each other in the transverse direction of the vehicle), to the lower walls 80 of the attachment brackets 14. In the present embodiment, the clamped plate 64 serves as a first clamped member, while each of the lower walls 80 of the attachment brackets 14 serves as a second clamped member. Each of the bolts 92 and a corresponding one of the flanged nuts 94 cooperate with each other to constitute a fastener. Each of the rod portions 90 of the bolts 92 and a corresponding one of the nuts 94 serve as a shaft body and a gripper body of the fastener, respectively. It is noted that each of the bolts 92 is fixed at its head portion 96 to a corresponding one of the lower walls 80 of the attachment brackets 14 by means of welding, whereby the two bolts 92 are fixed to the attachment brackets 14. It is noted that the clamped plate 64 and the lower walls 80 of the attachment brackets 14 cooperate with the fastener structure 70 to constitute a fixture for fixing the steering column 10 relative to the vehicle body.

Each of the slots 82 has an elongated portion 100 and a round hole portion 102 which is contiguous to a forward end of the elongated portion 100 and which has a diameter larger than a width of the elongated portion 100. The clamped plate 64 is fastened to the attachment brackets 14, with each of the opposite end portions of the clamped plate 64 being positioned relative to the lower wall 80 of the corresponding attachment bracket 14 in a position that permits the corresponding bolt 92 to pass through the round hole portion 102 rather than through the elongated portion 100. Between each of the opposite end portions of the clamped plate 64 and the lower wall 80 of the corresponding attachment bracket 14, there is interposed a spacer 108 made of a resin and having a rectangular shape. The spacer 108 has, in its center, a boss portion 106 which has an outside diameter slightly larger than an inside diameter of the round hole portion 102 of the slot 82, so that the boss portion 106 is fixed in the round hole portion 102 by an interference fit therebetween.

Further, a tubular collar 112 is mounted on each of the rod portions 90 of the bolts 92 with a radial clearance therebetween. The tubular collar 112 has a flange portion 110 in one of its axially opposite end portions, and is arranged to pass through the round hole portion 102 of the slot 82, with the flange portion 110 and the other of the axially opposite end portions being held in contact with the flanged nut 94 and the lower surface of the lower wall 80 of the attachment bracket 14, respectively, for thereby restraining or limiting a spacing distance between the lower wall 80 and the nut 94. That is, the tubular collar 112 serves as an operating or tightening amount limiter for limiting an operating or tightening amount of the bolt 92 and the nut 94. The tubular collar 112 has an outside diameter that is slightly larger than an inside diameter of a hole formed through the boss portion 106 of the spacer 108, so that the tubular collar 112 is fixed in the hole of the spacer 108 by an interference fit therebetween. As means for facilitating introduction of the collar 112 into the hole of the spacer 108 and preventing removal of the collar 112 from the hole of the spacer 108, an outer circumferential surface of the collar 112 and an inner circumferential surface of the hole of the spacer 108 are formed with, for example, chamfered surface, tapered surface and/or an engager groove (see FIGS. 6 and 8).

Between the nut 94 and the clamped plate 64, there is interposed a disk spring (Belleville washer) 120 having axially opposite end surfaces in the form of tapered surfaces, such that the disk spring 120 is held in its deformed state. Further, a washer 122 as a plate member is interposed between the disk spring 120 and the clamped plate 64, such that the disk spring 120 is interposed between the washer 122 and the flange portion 110 of the tubular collar 112. The washer 122 is held in contact at one of its opposite end surfaces with the clamped plate 64, so that an outer peripheral edge of the disk spring 120 does not bite the clamped plate 64.

The tubular collar 112 is arranged to pass through holes of the disk spring 120 and the washer 122. The hole of the disk spring 120 has an inside diameter larger than that of the hole of the washer 122, so that a radial clearance CL2 between the washer 122 and the rod portion 90 of the bolt 92 is smaller than a radial clearance CL1 between the disk spring 120 and the rod portion 90, as shown in FIG. 6. The inside diameter of the washer 122 is slightly smaller than an outside diameter of the tubular collar 112, so that the tubular collar 112 is fixed in the hole of the washer 122 by an interference fit. Meanwhile, the inside diameter of the disk spring 120 is somewhat larger than the outside diameter of the collar 112. Therefore, if there were not provided a disk-spring position limiter portion as described below, the position of the disk spring 120 could be deviated from that of the tubular collar 112 in the radial direction by a large amount, so that the disk spring 120 could be superposed at its inner peripheral edge on a rounded corner portion which is provided by a proximal end portion of the flange portion 110 of the collar 112, thereby disabling the disk spring 120 from being deflected or deformed evenly as viewed in its circumferential direction. An uneven deformation of the disk spring 120 could constitute a factor impeding generation of a suitable amount of clamping force and/or smooth movement of the clamped plate 64 relative to the attachment brackets 14. In the present embodiment, the washer 122 includes the disk-spring position limiter portion in the form of an annular projection 124 constituted by an entirety of the outer peripheral portion which is bent downwardly toward the axial direction away from the clamped plate 64. The annular projection 124 extends in the axial direction downwardly (i.e., in the direction away from the clamped plate 64) by a distance larger than an axial thickness of the disk spring 120, so that the disk spring 120 can be brought into abutting contact at its outer periphery with the annular projection 124 serving as a stopper, whereby a large radial deviation of the disk spring 120 can be prevented. That is, the annular projection 124 as the disk-spring position limiter portion serves to limit the radial position of the disk spring 120 relative to the rod portion 90 of the bolt 92.

In the present embodiment, the washer 122 is fixed to the tubular collar 112 by the interference fit therebetween, as describe above. This arrangement makes it possible to prepare, for example, prior to an operation to fix the steering column 10 to the portion of the vehicle body, an intermediate sub-assembly which is constituted by the washer 122, collar 112 and disk spring 120. FIG. 8 shows the sub-assembly in a stage before it is used for the fastening of the clamped plate 64 to the lower walls 80 of the attachment brackets 14. In this stage, the disk spring 120 maintains its original shape without being deformed, although the disk spring 120 is brought in its deformed state after it is mounted on the rod portions 90 of the bolts 92 and forced in the axial direction.

Figure 9:
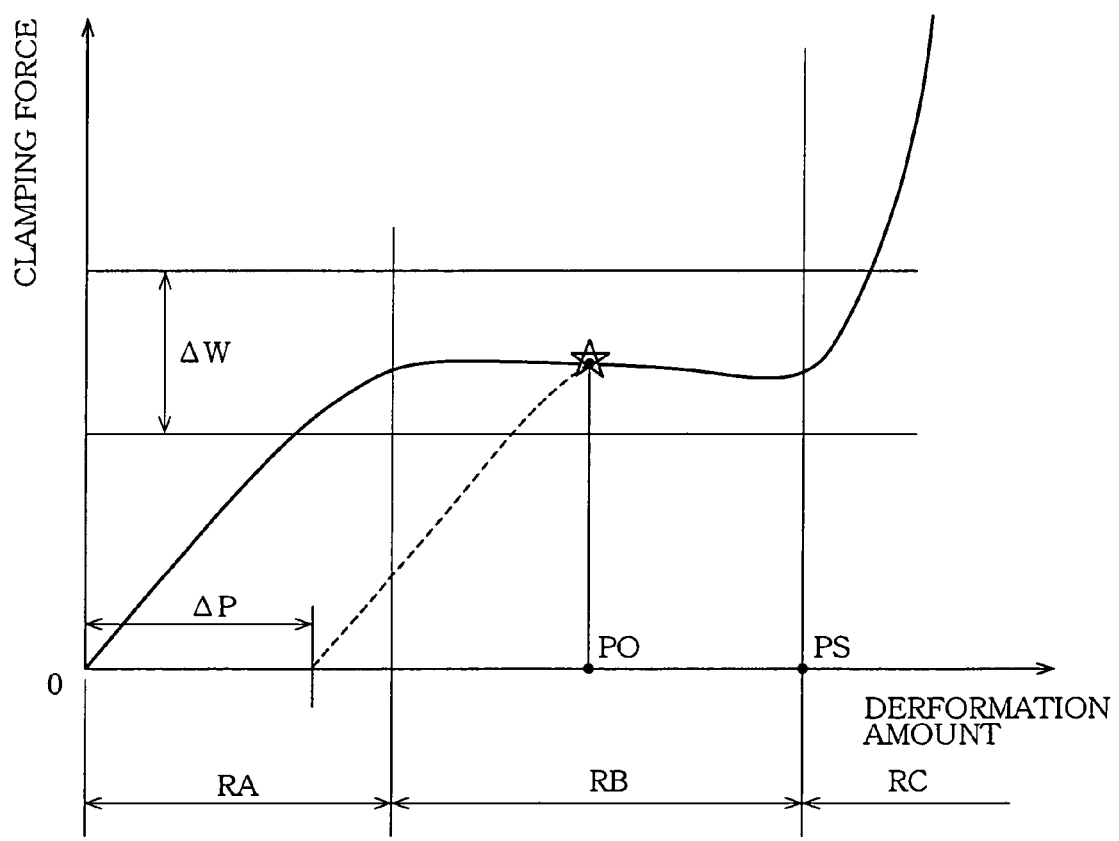
FIG. 9 is a graph showing a relationship between a clamping force and an amount of deformation of the disk spring in the fastening structure of FIG. 6.

The disk spring 120 having a conical shape as whole is mounted on the rod portion 90, such that the disk spring 120 is convexed downwardly, namely, such that its inner periphery (defining the hole) is located on a lower side of its outer periphery portion, as shown in FIG. 6. That is, the disk spring 120 is arranged to be held in contact at its inner periphery with the flange portion 110 of the tubular collar 112 (located on a lower side of the disk spring 120) and contact at its outer periphery with the washer 122 (located on au upper side of the disk spring 120). While being forced to be deformed in the axial direction, the disk spring 120 generates a restoring force which serves as the clamping force with which the clamped plate 64 is fastened to the lower walls 80 of the attachment brackets 14. FIG. 9 is a graph showing a relationship between the clamping force (i.e., clamping load) and an amount of deflection or deformation of the disk spring 120 (i.e., an amount of reduction in the axial length or inner height of the disk spring 120), which are represented by vertical and horizontal axes of the graph, respectively. As is apparent from the graph of FIG. 9, in an elastic deformation region RA which is an early stage starting with initiation of the deformation of the disk spring 120 subjected to a pressing force, the disk spring 120 is elastically deformed, exhibiting a relatively high rate of change of the clamping force with respect to change of the deformation amount. With further deformation of the disk spring 120 reaching or beyond a yield point, the elastic deformation region RA is followed by a plastic deformation region RB (i.e., intermediate stage) in which the disk spring 120 is plastically deformed. In the plastic deformation region RB, the disk spring 120 exhibits a relatively low rate of change of the clamping force with respect to change of the deformation amount. In the present embodiment, the clamping force is not substantially changed with increase in the deformation amount in the plastic deformation region RB. With still further deformation of the disk spring 120, the disk spring 120 is placed in a setting state in which the disk spring 120 is crushed to be flattened. An amount of the deformation of the disk spring 120 in the setting state is represented by PS in FIG. 9. After the setting state, the rate of changed of the clamping force becomes considerably high in a setting region RC.

The above-described characteristic exhibited by the disk spring 120 reveals that a substantially constant clamping force can be obtained over a wide range of the deformation amount, by setting a range ΔW including the clamping force in the plastic deformation region RB as a target range ΔW. With this fact taken into account, in the fastening structure 70, various dimensions of the components such as an axial length of the tubular collar 112 are determined such that the disk spring 120 is deformed by an amount corresponding to a deformation amount PO at a midpoint of the plastic deformation region RB. This arrangement is effective to stabilize the clamping force, even with variation in the deformation amount of the disk spring 120 due to presence of variation in dimensions of the components such as thickness of the spacer 108, thickness of the clamped plate 64, axial length of the disk spring 120 and axial length of the collar 112. That is, the fastening structure 70 is constructed to be capable of effectively absorbing the variation in the clamping force.

It is noted that, where the tightening of the bolt 92 and the nut 94 is released after the disk spring 120 has been once deformed to reach the plastic deformation region, the clamping force is reduced to zero, for example, along a chain line shown in the graph of FIG. 9. That is, while the clamping force is zeroed, the deformation amount is not zeroed due to presence of a residual deformation amount ΔP corresponding to the amount of the plastic deformation. If this disk spring 120 comes back to be subjected to the tightening of the bolt 92 and the nut 94, the clamping force is increased along the above-described chain line, resulting in reduction of the range of the deformation amount absorbing the variation in the clamping force. In view of this fact, it is preferable not to reuse the disk spring 120 which has been once used for the fastening, namely, which has been plastically deformed before. Further, in the fastening structure 70, since the length of the collar 112 and other dimensions of the components are determined such that the disk spring 120 is not placed in the setting state, the clamping force can be prevented from being excessively increased even where the bolt 92 and the nut 94 are tightened by an excessively large wrenching force.

With use of the fastening structure 70 constructed as described above, the steering column 10 can be firmly fixed relative to the instrument panel reinforcement 12, owing to a friction force which is based on the clamping force generated by the disk spring 120. Further, the fastening structure 70 is arranged to allow movement of the clamped plate 64 relative to the attachment brackets 14, in the event of a secondary collision between a vehicle's operator and the steering wheel 32, namely, in the event of application of impact load to the steering wheel 32 from the vehicle's operator, which load is larger than an upper limit. Described more specifically, the movement of the clamped plate 64 is allowed precisely when the applied impact load substantially exceeds a sum of a friction force acting between the clamped plate 64 and the spacer 108 and a friction force acting between the clamped plate 64 and the washer 122. While the column 10 is being fixedly supported without the movement of the clamped plate 64, the bolt 92 is positioned relative to the clamped plate 64 in a position permitting the rod portion 90 (on which the tubular collar 112 is mounted) to pass through the round hole portion 102 of the slot 82. Since the outside diameter of the tubular collar 112 is smaller than the width of the elongated portion 100 of the slot 82, the rod portion 90 surrounded by the tubular collar 112 can be moved to the elongated portion 100 which guides the rod portion 90, when the boss portion 106 of the spacer 108 is deformed as a result of the application of the above-described impact load larger than the upper limit. In this instance, the boss portion 106 does not generate substantially a deformation load arising from its deformation, since the spacer 108 including the boss portion 106 is made of resin. The round hole portion 102 of the slot 82 serves as a relative-position limiter portion for limiting position of the clamped plate 64 relative to the lower walls 80 of the attachment brackets 14, while the elongated portion 100 of the slot 82 serves as a movement allower portion for allowing movement of the rod portion 90 of the bolt 92 therealong. With the movement of the rod portion 90 along the elongated portion 100, the clamped plate 64 is moved in the axial direction of the column 10 that is parallel to the direction in which the slot 82 is elongated, and is removed from the instrument panel reinforcement 12.

In the fastening structure 70 which is arranged to stabilize the clamping force generated by the disk spring 120 without suffering variation in the clamping force, the steering column 10 can be accurately moved in event that the column 10 receives a load larger than a threshold. The rein-made spacer 108 interposed between the clamped plate 64 and each of the lower walls 80 of the attachment brackets 14 serves to stabilize the clamping force. Further, since the spacer 108 and the clamped plate 64 can smoothly slide on each other, a smooth movement of the clamped plate 64 is assured. Still further, the presence of the washer 122 between the clamped plate 64 and the disk spring 120 is effective to assure contact of the washer 122 and the clamped plate 64 at their mutually opposed surfaces with each other, thereby avoiding the disk spring 120 from biting the clamped plate 64 while enabling the washer 122 and the clamped plate 64 to be smoothly slide on each other. That is, the washer 122 also serves to facilitate a smooth movement of the clamped plate 64.

An operation to fix the steering column 10 relative to the instrument panel reinforcement 12 with use of the fastening structure 70 is carried out as follows.

The operation is initiated with a step of attaching the spacers 108 to the clamped plate 64 by fitting the boss portions 106 into the round hole portions 102 of the slots 82. In this instance, since each of the boss portions 106 is fixed to the corresponding round hole portion 102 by an interference fit therebetween, the spacers 108 are prevented from being removed. After the spacers 108 have been attached to the clamped plate 64, the steering column 10 is positioned below the attachment brackets 14 such that the rod portions 90 of the bolts 92 are received into the through-holes of the spacers 108. Then, the sub-assemblies each constituted by the tubular collar 112, disk spring 120 and washer 122 are fitted into the holes of the spacers 108 such that the rod portions 90 of the bolts 92 pass through the sub-assemblies. In this instance, since each of the collars 112 is fixed to the corresponding spacer 108 by an interference fit therebetween, the sub-assemblies are prevented from being removed. Further, the operation with use of the prepared sub-assemblies can be carried out more simply and easily than in case where the three members (i.e., the collar 112, disk spring 120 and washer 122) are mounted one by one on each of the rod portions 90 of the bolts 92. After the sub-assemblies have been mounted on the rod portions 90 of the bolts 92, the nuts 94 are tightly screwed onto the bolts 92 until each of the collars 112 is brought into contact at its axially opposite end surfaces with the lower wall 80 of the attachment bracket 14 and the nut 94, namely, until a certain tightening amount defined by the collar 112 is reached. In instance, a plain washer and/or a spring washer may be interposed between each of the collars 112 and the corresponding nut 94 for preventing the thread engagement from being released. The operation to fix the steering column 10 relative to the instrument panel reinforcement 12 is completed by a series of steps as described above, which can be easily and quickly implemented. In general, it is difficult for an operator to manually fix the steering column 10 relative to the instrument panel reinforcement 12, by moving the column 10 upward toward the instrument panel reinforcement 12, since such an operation has to be done while the column 10 is being sustained with at least one of his hands. Such an operational difficulty, however, can be alleviated by using the present fastening structure 70 which has the above-described constructional features, i.e., the interference-fit between the boss portion 106 and round hole portion 102, the preparable sub-assembly constituted by the collar 112, disk spring 120 and washer 122, and the interference-fit between the spacer 108 and collar 122.

What is claimed is:

1. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body; and (b) a disk spring mounted on said shaft body of said fastener and held in a deformed state thereof, for generating a clamping force with which the first and second clamped members are fastened to each other, wherein said disk spring has axially opposite end surfaces in the form of tapered surfaces, and wherein said disk spring is forced against at least one of the first and second clamped members and is plastically deformed.

2. The structure according to claim 1, wherein said disk spring is forced against at least one of the first and second clamped members and is deformed without being crushed.

3. The structure according to claim 1, further comprising a deformation amount limiter which limits an amount of deformation of said disk spring.

4. The structure according to claim 1, further comprising a plate member,
wherein said disk spring is interposed between the first clamped member and one of said gripper body and the second clamped member,
and wherein said plate member is interposed between the first clamped member and said disk spring, and is held in contact with the first clamped member.

5. The structure according to claim 4, further comprising a tubular collar which is mounted on said shaft body, and which passes through the slot of the first clamped member, a hole of said disk spring and a hole of said plate member,
wherein said tubular collar is held in contact at axially opposite ends thereof with the second clamped member and said gripper body, so as to limit a distance between the second clamped member and said gripper body.

6. The structure according to claim 5,
wherein said tubular collar includes a flange portion provided by an axial end portion thereof,
and wherein said disk spring is interposed between said flange portion and said plate member.

7. The structure according to claim 1,
wherein said shaft body is provided by an externally threaded member tightly screwed into an internally threaded member provided by one of said gripper and the second clamped member which are connected to each other through said shaft body,
and wherein said disk spring is mounted on said shaft body of said fastener, while being forced against at least one of the first and second clamped members, by thread engagement between said externally and internally threaded members.

8. The structure according to claim 1, further comprising a tubular collar that is held in contact at axially opposite ends thereof with the second clamped member and said gripper body, so as to define a distance between the second clamped body and said gripper body,
wherein said disk spring is interposed between the first clamped member and one of said gripper body and the second clamped member, and wherein said tubular collar, which defines said distance, has an axial length that causes said disk spring to be plastically deformed.

9. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body; and (b) a disk spring mounted on said shaft body of said fastener and held in a deformed state thereof, for generating a clamping force with which the first and second clamped members are fastened to each other, wherein said disk spring has axially opposite end surfaces in the form of tapered surfaces, said structure further comprising a plate member, wherein said disk spring is interposed between the first clamped member and one of said gripper body and the second clamped member, wherein said plate member is interposed between the first clamped member and said disk spring, and is held in contact with the first clamped member, wherein said plate member has a hole formed therethrough, and is mounted on said shaft body of said fastener with a second radial clearance therebetween that is smaller than a first radial clearance between said shaft body and said disk spring which is mounted on said shaft body, and wherein said plate member has a disk-spring position limiter portion provided by an outer peripheral portion thereof and limits a radial position of said disk spring relative to said shaft body.

10. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body; and (b) a disk spring mounted on said shaft body of said fastener and held in a deformed state thereof, for generating a clamping force with which the first and second clamped members are fastened to each other, wherein said disk spring has axially opposite end surfaces in the form of tapered surfaces, said structure further comprising a plate member, wherein said disk spring is interposed between the first clamped member and one of said gripper body and the second clamped member, wherein said plate member is interposed between the first clamped member and said disk spring, and is held in contact with the first clamped member, said structure further comprising a tubular collar which is mounted on said shaft body, and which passes through the slot of the first clamped member, a hole of said disk spring and a hole of said plate member, wherein said tubular collar is held in contact at axially opposite ends thereof with the second clamped member and said gripper body, so as to limit a distance between the second clamped member and said gripper body, wherein said tubular collar includes a flange portion provided by an axial end portion thereof, wherein said disk spring is interposed between said flange portion and said plate member, and wherein said tubular collar, passing through said hole of said plate member, is fixed to said plate member by an interference fit between said tubular collar and said hole of said plate member.

11. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body; and (b) a disk spring mounted on said shaft body of said fastener and held in a deformed state thereof, for generating a clamping force with which the first and second clamped members are fastened to each other, wherein said disk spring has axially opposite end surfaces in the form of tapered surfaces, said structure further comprising a plate member, wherein said disk spring is interposed between the first clamped member and one of said gripper body and the second clamped member, wherein said plate member is interposed between the first clamped member and said disk spring, and is held in contact with the first clamped member, said structure further comprising a tubular collar which is mounted on said shaft body, and which passes through the slot of the first clamped member, a hole of said disk spring and a hole of said plate member, wherein said tubular collar is held in contact at axially opposite ends thereof with the second clamped member and said gripper body, so as to limit a distance between the second clamped member and said gripper body, wherein said tubular collar includes a flange portion provided by an axial end portion thereof, and wherein said disk spring is interposed between said flange portion and said plate member, said structure further comprising a resin-made spacer having a boss portion and a hole which is formed through said boss portion, and mounted on said shaft body of said fastener, wherein said tubular collar is held in contact at said flange portion and another axial end portion with said gripper body and the second clamped member, respectively, wherein said disk spring is gripped between said plate member and said flange portion of said tubular collar which are interposed between the first clamped member and said gripper body, wherein said resin-made spacer is fitted at said boss portion thereof in the slot of the first clamped member, and is held in contact at opposite side surfaces thereof with the first and second clamped members which cooperate with each other to grip said resin-made spacer, and wherein said tubular collar is fitted in said hole of said resin-made spacer.

12. The structure according to claim 11, wherein said tubular collar, fitted in said hole of said resin-made spacer, is fixed to said resin-made spacer by an interference fit between said tubular collar and said hole of said resin-made spacer.

13. A fixture for fixing a steering column of a vehicle relative to a body of the vehicle such that the steering column is movable relative to the vehicle body in event of application of an excessively large load to the steering column, said fixture comprising:

a first clamped member which is linked to one of the steering column and a portion of the vehicle body and which has a slot formed therein and elongated in an elongated direction parallel to a direction in which the steering column is movable;

a second clamped member which is linked to the other of the steering column and the portion of the vehicle body; and the structure defined in claim 10, wherein said slot of said first clamped member has (i) a relative-position limiter portion in which said boss portion of said resin-made spacer is fitted for limiting a position of said first clamped member relative to said second clamped member, and (ii) a movement allower portion extending from said relative-position limiter portion in said elongated direction and having a width smaller than an outside diameter of said boss portion and larger than an outside diameter of said tubular collar which is mounted on said shaft body of said fastener, and wherein said fastener fastens said first and second clamped members to each other, with said boss portion being fitted in said relative-position limiter portion, and allows movement of said shaft body along said movement allower portion so as to allow said first clamped member to be moved relative to said second clamped member in said direction parallel to said elongated direction in event that the steering column receives a load larger than a threshold and causing deformation of said boss portion which permits said boss portion to be moved from said relative-position limiter portion to said movement allower portion.

14. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body;

(b) a disk spring mounted on said shaft body of said fastener while being forced against at least one of the first and second clamped members so as to be held in a deformed state thereof, for generating a clamping force with which the first and second clamped members are fastened to each other; and (c) a plate member, wherein said disk spring is interposed between the first clamped member and one of said gripper body and the second clamped member, wherein said plate member is interposed between the first clamped member and said disk spring, and is held in contact with the first clamped member, wherein said plate member has a hole formed therethrough, and is mounted on said shaft body of said fastener with a second radial clearance therebetween that is smaller than a first radial clearance between said shaft body and said disk spring which is mounted on said shaft body, and wherein said plate member has a disk-spring position limiter portion provided by an outer peripheral portion thereof and limits a radial position of said disk spring relative to said shaft body.

15. The structure according to claim 14, further comprising a tubular collar which is mounted on said shaft body, and which passes through the slot of the first clamped member, a hole of said disk spring and a hole of said plate member, wherein said tubular collar is held in contact at axially opposite ends thereof with the second clamped member and said gripper body, so as to limit a distance between the second clamped member and said gripper body.

16. The structure according to claim 15, wherein said tubular collar includes a flange portion provided by an axial end portion thereof, and wherein said disk spring is interposed between said flange portion and said plate member.

17. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body;

(b) a disk spring mounted on said shaft body of said fastener while being forced against at least one of the first and second clamped members so as to be held in a deformed state thereof, for generating a clamping force with which the first and second clamped members are fastened to each other; and (c) a plate member, wherein said disk spring is interposed between the first clamped member and one of said gripper body and the second clamped member, wherein said plate member is interposed between the first clamped member and said disk spring, and is held in contact with the first clamped member, said structure further comprising a tubular collar which is mounted on said shaft body, and which passes through the slot of the first clamped member, a hole of said disk spring and a hole of said plate member, wherein said tubular collar is held in contact at axially opposite ends thereof with the second clamped member and said gripper body, so as to limit a distance between the second clamped member and said gripper body, wherein said tubular collar includes a flange portion provided by an axial end portion thereof, wherein said disk spring is interposed between said flange portion and said plate member, and wherein said tubular collar, passing through said hole of said plate member, is fixed to said plate member by an interference fit between said tubular collar and said hole of said plate member.

18. A structure for fastening a column side member linked to a steering column of a vehicle, to a vehicle-body side member linked to a portion of a body of the vehicle, so as to fix the steering column relative to the vehicle body such that the steering column is movable relative to the vehicle body in event of application of an excessively large load to the steering column, wherein one of the column side member and the vehicle-body side member provides a first clamped member having a slot formed therein and elongated in a direction parallel to a direction in which the steering column is movable, while the other of the column side member and the vehicle-body side member provides a second clamped member, said structure comprising:

(a) a fastener including (a-1) a gripper body cooperating with the second clamped member to grip the first clamped member which is interposed between said gripper body and the second clamped member, and (a-2) a shaft body passing through the slot of the first clamped member and connected to the second clamped member and said gripper body;

(b) a disk spring mounted on said shaft body of said fastener while being forced against at least one of the first and second clamped members so as to be held in a deformed state thereof, for generating a clamping force with which the first and second clamped members are fastened to each other; and (c) a plate member, wherein said disk spring is interposed between the first clamped member and one of said gripper body and the second clamped member, wherein said plate member is interposed between the first clamped member and said disk spring, and is held in contact with the first clamped member, said structure further comprising a tubular collar which is mounted on said shaft body, and which passes through the slot of the first clamped member, a hole of said disk spring and a hole of said plate member, wherein said tubular collar is held in contact at axially opposite ends thereof with the second clamped member and said gripper body, so as to limit a distance between the second clamped member and said gripper body, wherein said tubular collar includes a flange portion provided by an axial end portion thereof, and wherein said disk spring is interposed between said flange portion and said plate member, said structure further comprising a resin-made spacer having a boss portion and a hole which is formed through said boss portion, and mounted on said shaft body of said fastener, wherein said tubular collar is held in contact at said flange portion and another axial end portion with said gripper body and the second clamped member, respectively, wherein said disk spring is gripped between said plate member and said flange portion of said tubular collar which are interposed between the first clamped member and said gripper body, wherein said resin-made spacer is fitted at said boss portion thereof in the slot of the first clamped member, and is held in contact at opposite side surfaces thereof with the first and second clamped members which cooperate with each other to grip said resin-made spacer, and wherein said tubular collar is fitted in said hole of said resin-made spacer.

19. The structure according to claim 18, wherein said tubular collar, fitted in said hole of said resin-made spacer, is fixed to said resin-made spacer by an interference fit between said tubular collar and said hole of said resin-made spacer.

20. A fixture for fixing a steering column of a vehicle relative to a body of the vehicle such that the steering column is movable relative to the vehicle body in a direction away from an operator's seat of the vehicle in event of application of an excessively large load to the steering column in the direction away from the operator's seat, said fixture comprising:

a first clamped member which is liked to one of the steering column and a portion of the vehicle body and which has a slot formed therein and elongated in an elongated direction parallel to the direction in which the steering column is movable;

a second clamped member which is liked to the other of the steering column and the portion of the vehicle body; and the structure defined in claim 18, wherein said slot of said first clamped member has (i) a relative-position limiter portion in which said boss portion of said resin-made spacer is fitted for limiting a position of said first clamped member relative to said second clamped member, and (ii) a movement allower portion extending from said relative-position limiter portion in said elongated direction and having a width smaller than an outside diameter of said boss portion and larger than an outside diameter of said tubular collar which is mounted on said shaft body of said fastener, and wherein said fastener fastens said first and second clamped members to each other, with said boss portion being fitted in said relative-position limiter portion, and allows movement of said shaft body along said movement allower portion so as to allow said first clamped member to be moved relative to said second clamped member in said elongated direction in event that the steering column receives a load which is larger than a threshold and which causes said boss portion to be deformed.

* * * * *